United States Patent
Truong et al.

(10) Patent No.: US 10,916,263 B1
(45) Date of Patent: Feb. 9, 2021

(54) SPLIT YOKE DESIGN FOR HIGH DATA RATE TAMR WRITER HEAD STRUCTURE

(71) Applicant: Headway Technologies, Inc., Milpitas, CA (US)

(72) Inventors: Alain Truong, Santa Clara, CA (US); Tobias Maletzky, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 16/674,299

(22) Filed: Nov. 5, 2019

(51) Int. Cl.
*G11B 5/31* (2006.01)
*G11B 5/127* (2006.01)
*G11B 5/00* (2006.01)

(52) U.S. Cl.
CPC .......... *G11B 5/3146* (2013.01); *G11B 5/1278* (2013.01); *G11B 5/314* (2013.01); *G11B 5/3116* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 6,542,331 B1 * | 4/2003 | Chang | ..................... | G11B 5/312 360/125.41 |
| 7,440,660 B1 * | 10/2008 | Jin | ..................... | B82Y 10/00 369/112.27 |
| 8,373,945 B1 * | 2/2013 | Luo | ..................... | G11B 5/3123 360/123.11 |
| 8,537,495 B1 | 9/2013 | Luo et al. | | |
| 9,053,715 B1 * | 6/2015 | Wang | ..................... | G11B 5/3116 |
| 9,142,233 B1 * | 9/2015 | Gibbons | ..................... | G11B 5/6088 |
| 9,286,918 B1 | 3/2016 | Xue et al. | | |
| 9,620,153 B1 * | 4/2017 | Sasaki | ..................... | G11B 5/3123 |
| 9,721,591 B1 * | 8/2017 | Liu | ..................... | G11B 5/3109 |
| 10,204,644 B1 | 2/2019 | Benakli et al. | | |
| 2005/0135005 A1 * | 6/2005 | Im | ..................... | G11B 5/1278 360/125.12 |
| 2008/0266721 A1 * | 10/2008 | Kameda | ..................... | G11B 5/3116 360/314 |
| 2012/0147503 A1 * | 6/2012 | Zou | ..................... | G11B 5/3116 360/125.41 |
| 2015/0262595 A1 * | 9/2015 | Aoki | ..................... | G11B 5/6088 369/13.11 |

* cited by examiner

*Primary Examiner* — Jefferson A Evans
(74) *Attorney, Agent, or Firm* — Saile Ackerman LLC; Stephen B. Ackerman

(57) ABSTRACT

A write head configured for thermally assisted magnetic recording (TAMR) has a split-yoke design that allows the yoke and magnetic pole to be formed as planar layers while the split between left and right-side portions of the yoke and magnetic pole eliminate adverse coupling between the magnetic writing field and the optical near-field heating field. The planar design is easy to fabricate and provides rapid rise time and a strong magnetic field using fewer current-carrying coils than in the prior art.

16 Claims, 10 Drawing Sheets

*LRP (6 turns pancake)*

*TRC (3 turns helical)*

*SYD (4 turns pancake)*

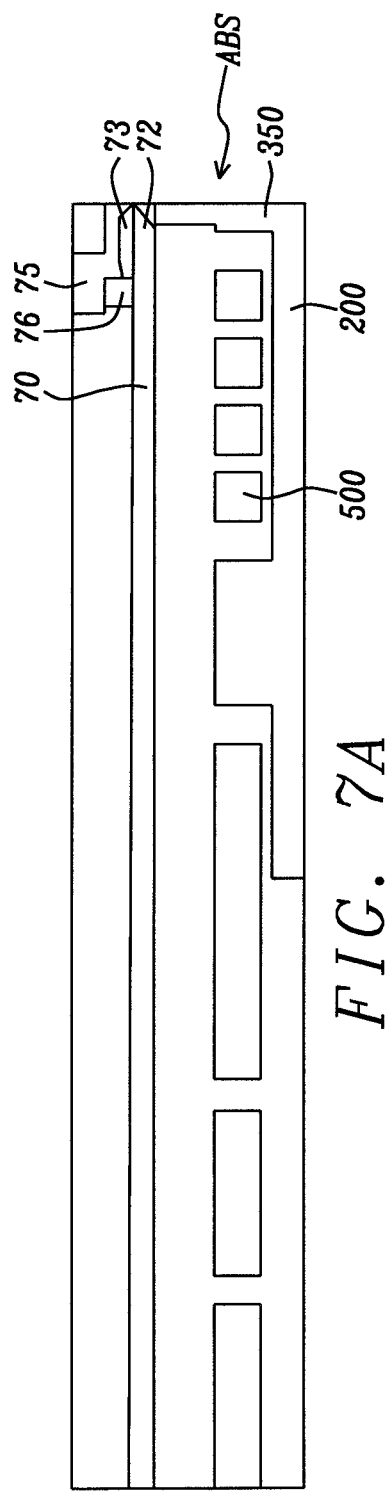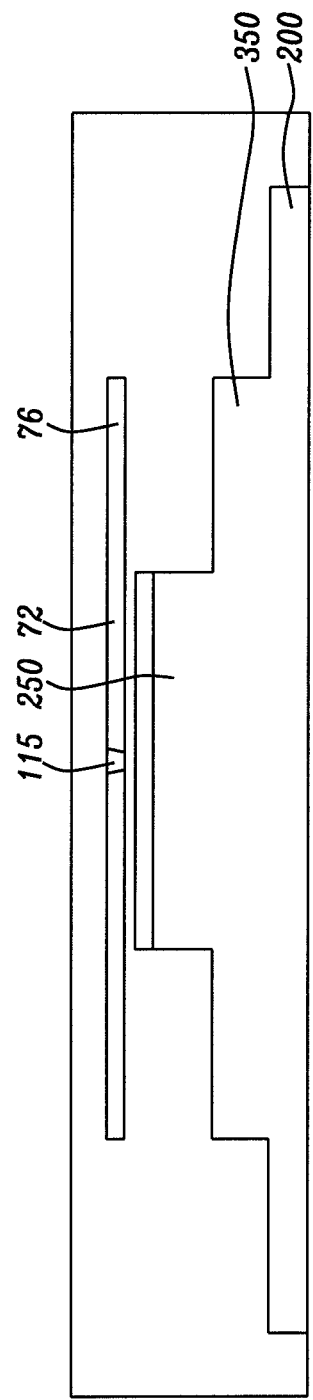
FIG. 7A
FIG. 7B

SPLIT YOKE DESIGN FOR HIGH DATA RATE TAMR WRITER HEAD STRUCTURE

1. TECHNICAL FIELD

This disclosure relates to magnetic write heads that write on magnetic recording media, particularly to yoke design for TAMR high data rate write heads.

2. BACKGROUND

The concept of Thermally Assisted Magnetic recording (TAMR) consists in applying heat locally on the recording media to temporarily reduce its anisotropy and allow the magnetic field from the writer head to polarize the magnetization of the magnetic grains of the media. In principle, once the grains cool down to room temperature, they should then remain thermally stable.

A major challenge in TAMR is to obtain higher area density capacity of the recording medium and higher data rates for the write head than the current technology provides. Generating relatively high magnetic fields (of the order of 10 kOe or higher) is also crucial to initialize and stabilize the orientation of the magnetic moments of the media grains in a specific magnetization state during the heating process.

The magnetic materials from which recording heads are fabricated are metallic and are known to have poor optical properties. As a result, they are capable of causing optical power loss if placed in proximity to the near field transducer that is the source of the optical power supplied to the recording medium. The prior art has dealt with optical power loss by introducing a slope at the tip of the main pole of the recording head so that the area of the pole overlapping with the near field transducer is minimized.

One type of prior art writer head design, designated herein as "LRP design", is capable of delivering relatively high magnetic fields (about 11 kOe at saturation), but because the main pole is not made of a continuous piece of material as a result of the way the slope of the main pole is constructed, the LRP design delivers slow rise time, which will eventually limit its ability to perform well at high data rates.

Another prior art writer head design, designated herein "TRC design", features a sloped main pole made of a continuous piece of high-moment magnetic material. This is found to yield head field rise time benefits and high magnetic fields (10 kOe), but is difficult to fabricate.

While being beneficial when dealing with optical power losses, such sloped pole head designs are either not optimal for magnetic flux propagation and have slow field rise time (LRP design), or they have a fast rise time but are far from easy to fabricate (TRC design). The TRC design, for example, requires several hundreds of process steps for just creating the slope of the main pole. What is needed, is a new design that is easy to fabricate and provides fast rise time, strong fields and magnetic parts whose geometry does not induce optical power loss for optimal power transfer to the near field transducer.

SUMMARY

A first object of the present disclosure is to provide a magnetic writer that is easy to fabricate and provides strong fields and fast rise time.

A second object of the present disclosure is to provide such an easy-to-fabricate magnetic writer design that produces strong fields and fast rise time, yet uses a magnetic pole and yoke design that are planar and optimize optical power transfer to the recording medium.

The above, as well as other objects, are achieved by a TAMR (Thermally Assisted Magnetic Recording) write head that includes among its elements (to be fully discussed below with reference to FIG. 1C):

a top yoke, a main magnetic pole beneath the top yoke, a return magnetic pole vertically beneath and parallel to the main magnetic pole, a connector formed between the main magnetic pole and return pole, where the connector provides flux closure between the main magnetic pole and return pole.

The top yoke and main magnetic pole are contiguous horizontal planar layers extending distally from a rear terminus towards an ABS, where the top yoke and the main magnetic pole are split into two separate portions, which are preferably mirror symmetric in shape. Each separate portion of the contiguous top yoke and main magnetic pole are preferably substantially rectangular for a certain distance from their rear terminus towards their ABS ends. The rear terminus is preferably co-extensive with a rear terminus of the connector, but may extend proximally beyond the rear terminus and the mirror-symmetric portions extend distally towards an ABS plane, remaining parallel to the return pole, until a "splitting point" where the top yoke and the main magnetic pole diverge in shape and from which point on the main magnetic pole layer extends to the ABS while the top yoke layer terminates a certain distance away from the ABS.

The two, separate, preferably mirror-symmetric portions are located horizontally side-by-side, having been formed by use of conventional fabrication techniques of photolithography, deposition and etching steps. The shape of the top layer is produced by a photolithography mask.

The two portions are affixed to and supported by the connector, so that they form a preferably mirror-symmetric split structure with a uniform width gap formed between parallel adjacent inner edges of the two portions along which the top yoke and the main magnetic pole layers are substantially identical in shape and congruent, but where, further distally, the adjacent edges of the two portions converge, forming a flare angle that brings the main pole layer and top yoke layer of both portions substantially into contact. From this point the main pole extends distally beyond the top yoke to the ABS and the top yoke terminates at a distance away from said ABS.

There is a clear difference in rise time between the new design (SYD) and the prior art design (LRP).

Figure 3A:
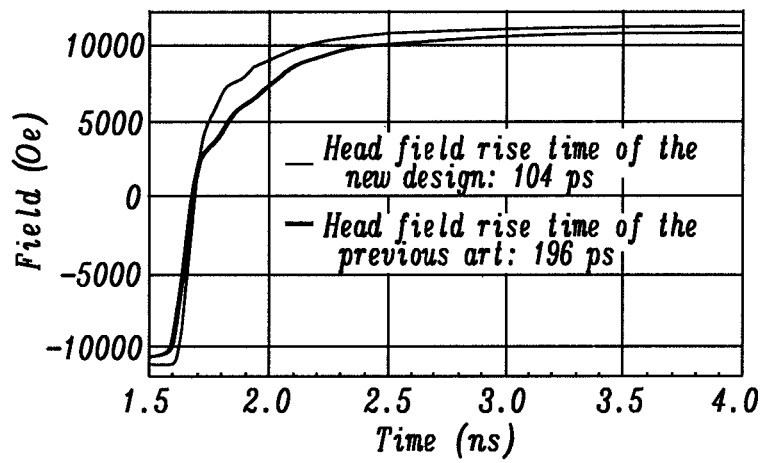
FIG. 3A is a graphical comparison of the perpendicular component of the magnetic fields produced by a prior art design and the new design. The perpendicular component of the head field is plotted as a function of time for both heads.
Figure 3B:
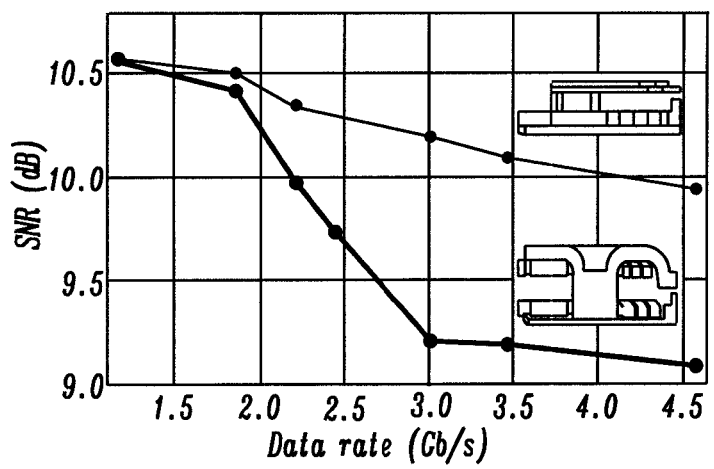

FIG. 3B shows that the faster rise time of the SYD split yoke design will help in maintaining higher levels of signal-to-noise ratio at faster data rates than the prior art (calculations performed for 2000 KFCI and 510 KTPI).

Figure 4A:
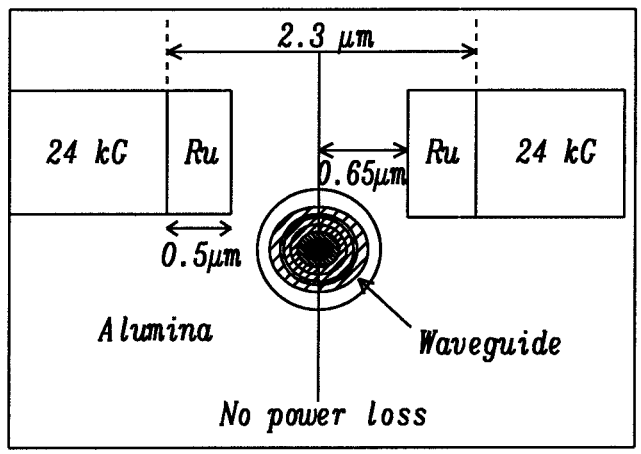
Figure 4B:
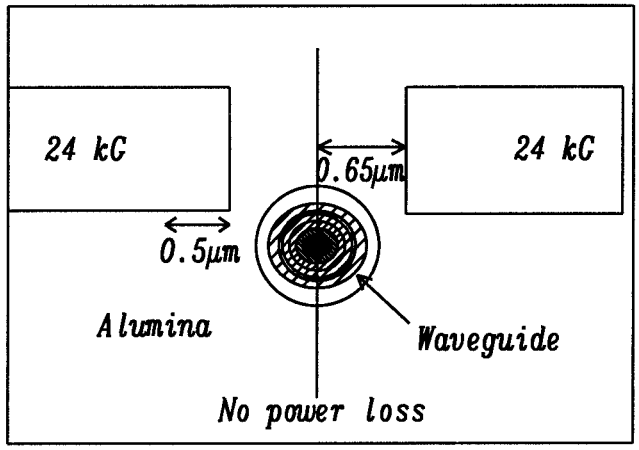

FIGS. 4A and 4B each shows a section of the SYD design in a plane orthogonal to the ABS axis, where the gap in the split yoke and split pole is maximal (2.3 μm). The results of two simulations, for different heat-sink materials, shows that in either case there is no electric field absorption from the 24 kG main pole region; therefore, we conclude that the gap is sufficiently large to avoid optical power loss. In simulation (A) the 24 kG main pole is surrounded by a 500 nm wide Ru heat sink, thus reducing the gap. In simulation (B) the Ru heat sink parts were replaced by a 24 kG material.

Figure 4C:
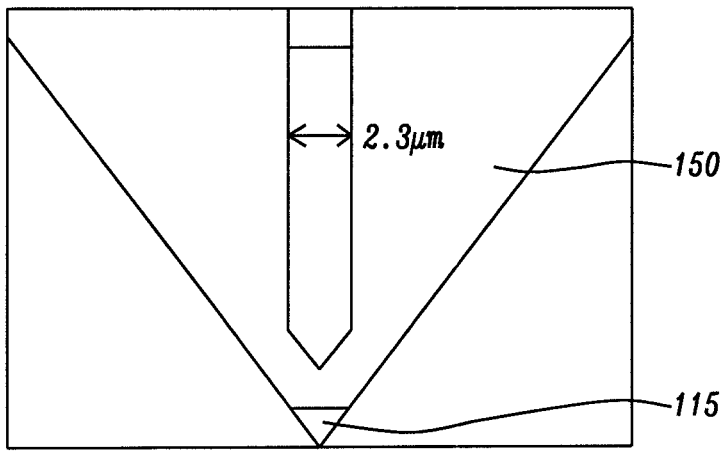

FIG. 4C shows an overhead view of the geometry in 4A and 4B.

Figure 5A:
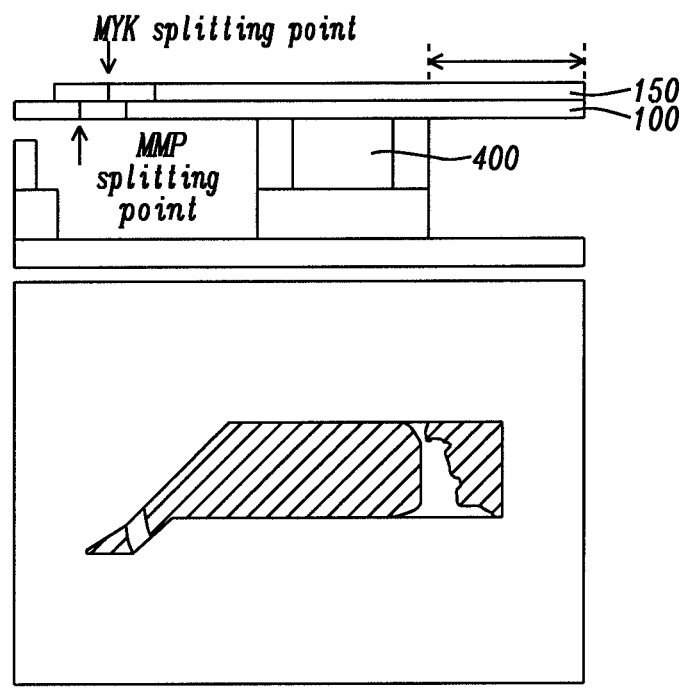
Figure 5B:
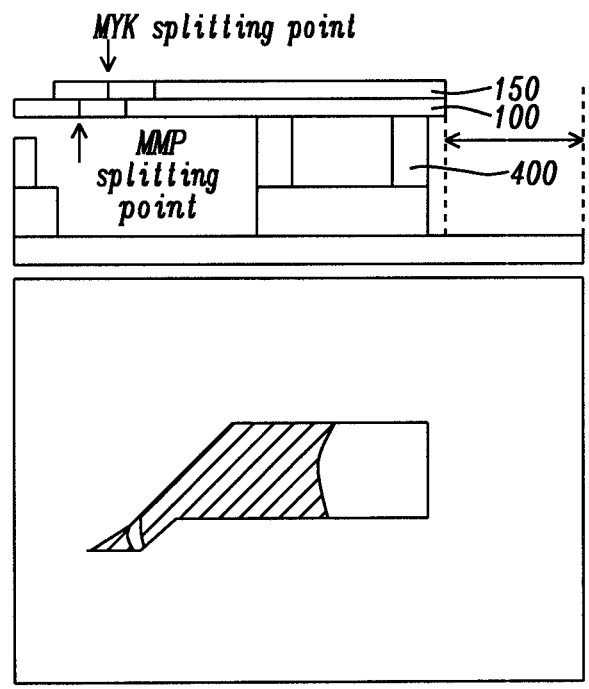

FIGS. 5A and 5B show the effects on the magnetic flux in the main pole of the extension of the top yoke and main pole beyond the via connector. FIG. 5A shows the yoke and pole extending beyond the connector, FIG. 5B shows the yoke and pole trimmed at the proximal edge of the connector.

Figure 6A:
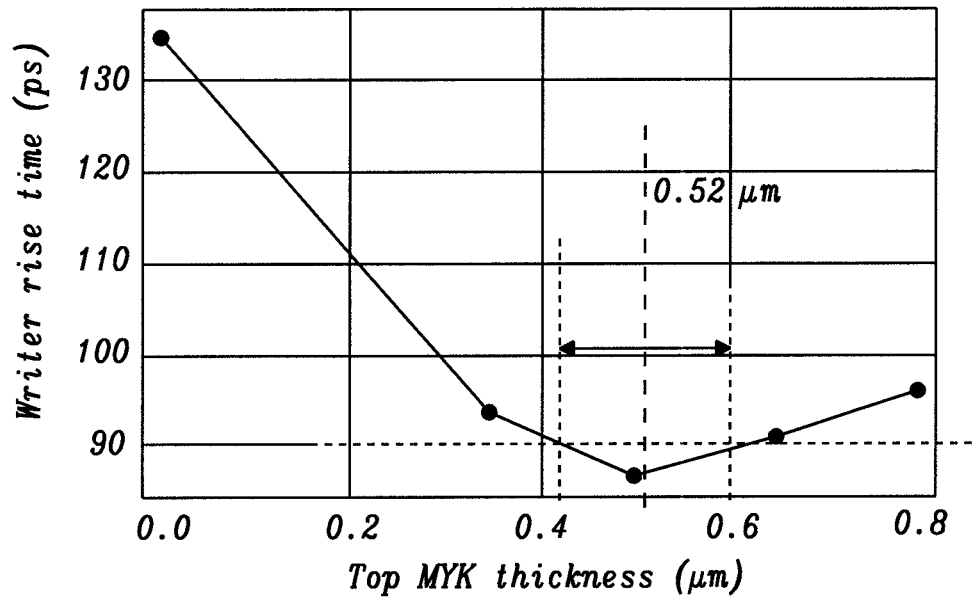
Figure 6B:
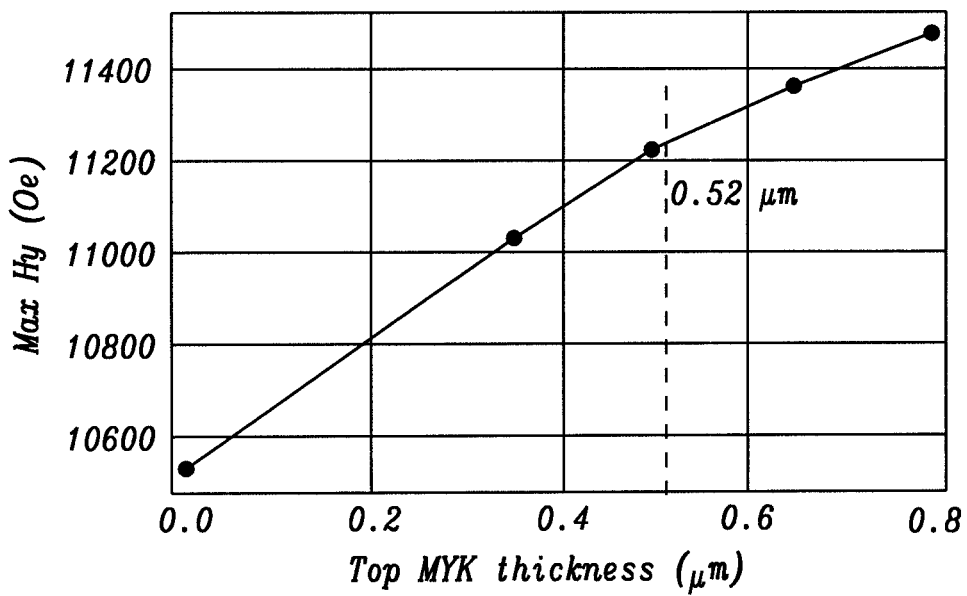

FIGS. 6A and 6B graphically show the top yoke thickness-dependence of the writer head-field rise-time (in 6A) and the maximum perpendicular field (in 6B). The perpendicular field increases monotonically with the top yoke thickness while the head field rise-time shows an optimum at about 0.5 μm.

FIGS. 7A and 7B schematically shows side (A) and ABS (B) views of the write head and such associated TAMR apparatus as the waveguide, waveguide blocker and near-field transducer.

Figure 8:
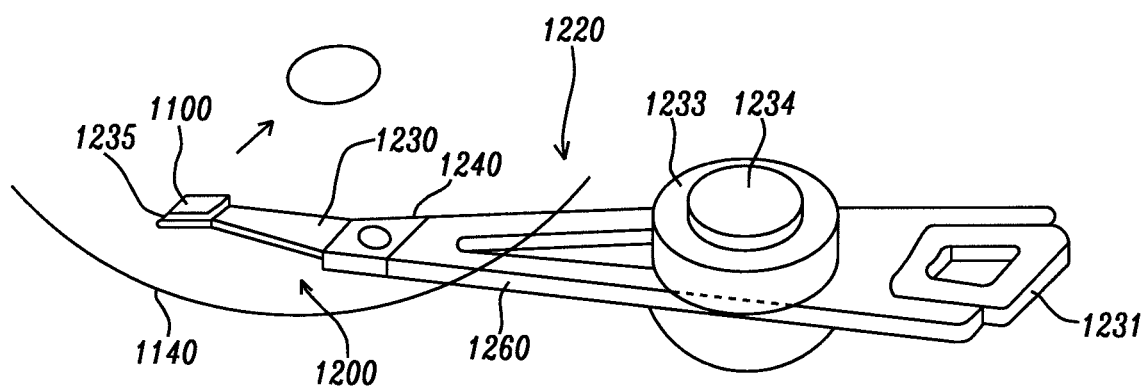

FIG. 8 schematically shows the slider-mounted TAMR head described herein further mounted on a head-gimbal assembly.

Figure 9:
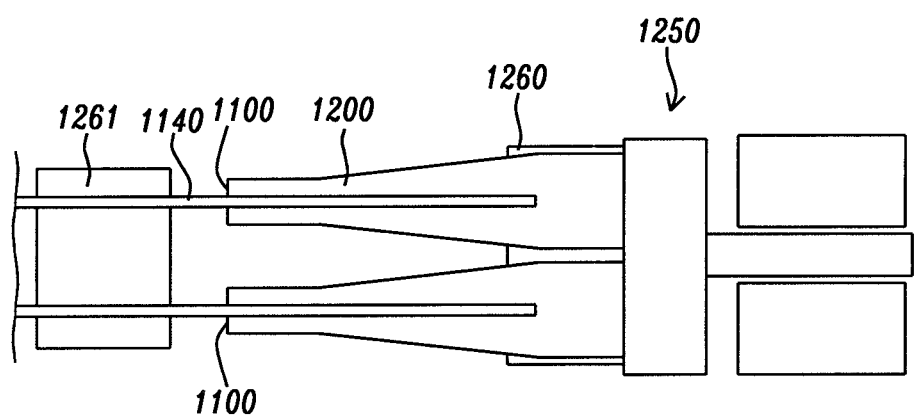

FIG. 9 schematically shows a side view of a head stack assembly of the present recording apparatus.

Figure 10:
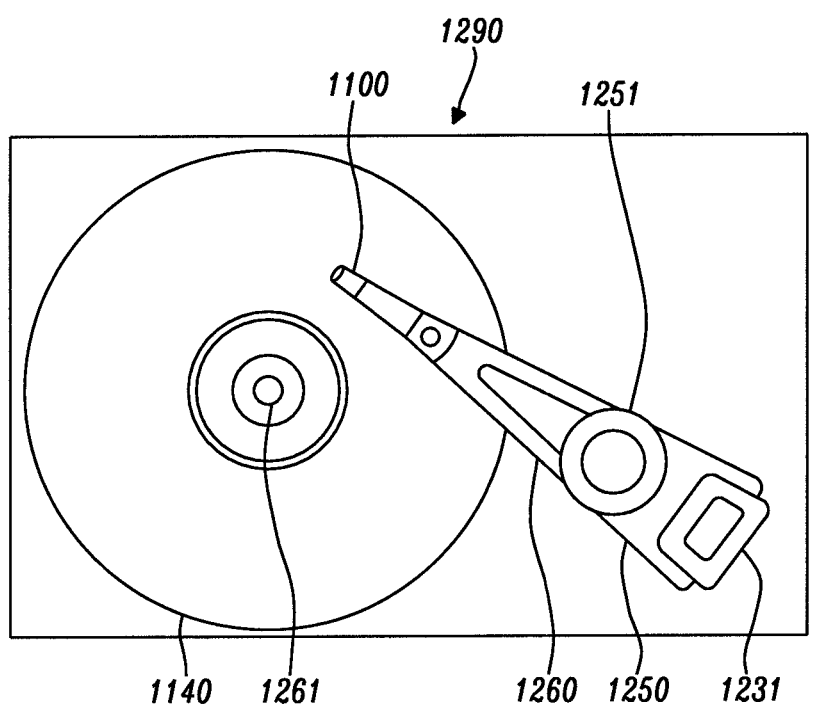

FIG. 10 schematically shows a plan view of the magnetic recording apparatus within which are mounted the components shown in FIGS. 7 and 8.

DETAILED DESCRIPTION

In the following we will briefly describe two generally known prior art design approaches for TAMR writers, denoted the LRP and TRC designs and then contrast them with the presently disclosed write head, denoted the SYD design.

Figure 1A:
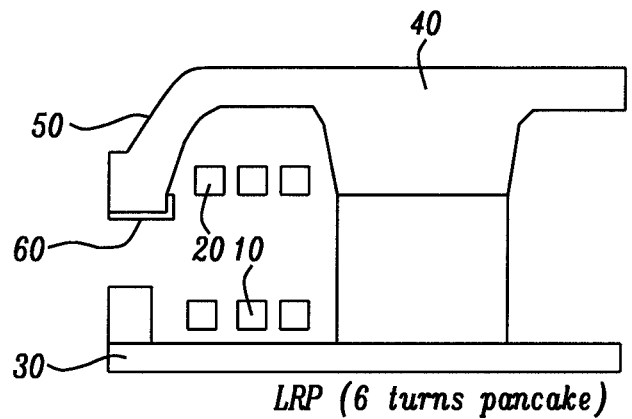
FIGS. 1A and 1B are schematic side view representations of two prior art writers designated LRP and TRC.
Figure 1B:
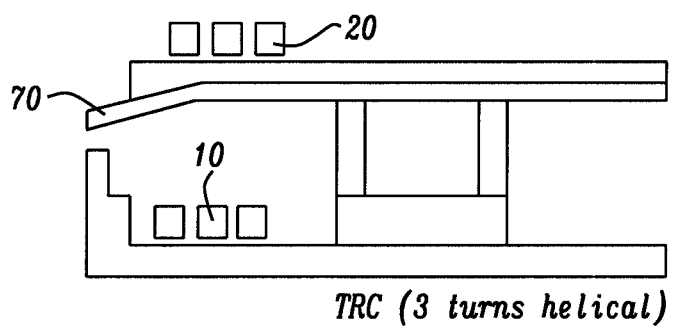
Figure 1C:
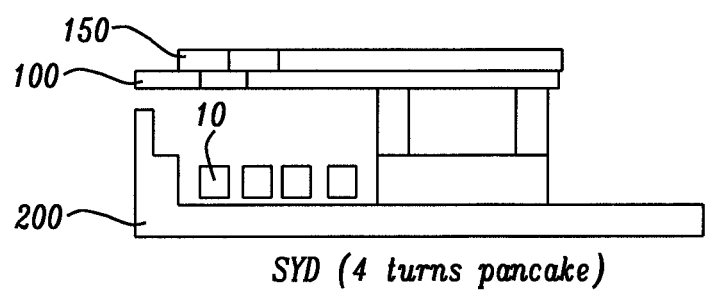
FIG. 1C is a schematic side view of the presently disclosed SYD (split yoke design) writer.

Referring to FIGS. 1A, 1B and 1C, there is shown schematic side views of what will be denoted the prior-art LRP, prior-art TRC and presently disclosed SYD writer designs respectively. FIG. 1A shows that the inductive coils of the LRP design are formed in two vertically separated, flat (pancake) layers 10, 20, having three turns each. This prior-art design, LRP, required 6 turns of coils to increase the magnetic flux density and generate higher fields at the main pole. Such a high number of turns means that the turns will inevitably have to be separated into two layers in order to accommodate a near field transducer (not shown) that will supply energy to the recording media. The bottom coil layer 10 is on top of the return pole 30 and the top coil layer 20 has to fit under the top yoke 40. The main pole 60 is beneath the top yoke 40. As a result, the top coil layer 20 has forced the top yoke 40 to be plated around the coils, resulting in a downward curvature 50 which does not favor the head field rise time. The SYD feature in the new design has improved performance compared to the previous design and only requires one layer of 4 turns of coils.

The next previous design, TRC, features a sloped main pole 70, which is beneficial for magnetic field rise time. But the steps involved in fabricating such a slope makes the overall process lengthy.

The presently disclosed SYD writer eliminates the need for a sloped pole and requires far fewer process steps than the TRC design. The new writer head structure is also expected to show lower heat-induced writer protrusion than the LRP and TRC designs.

Figure 2A:
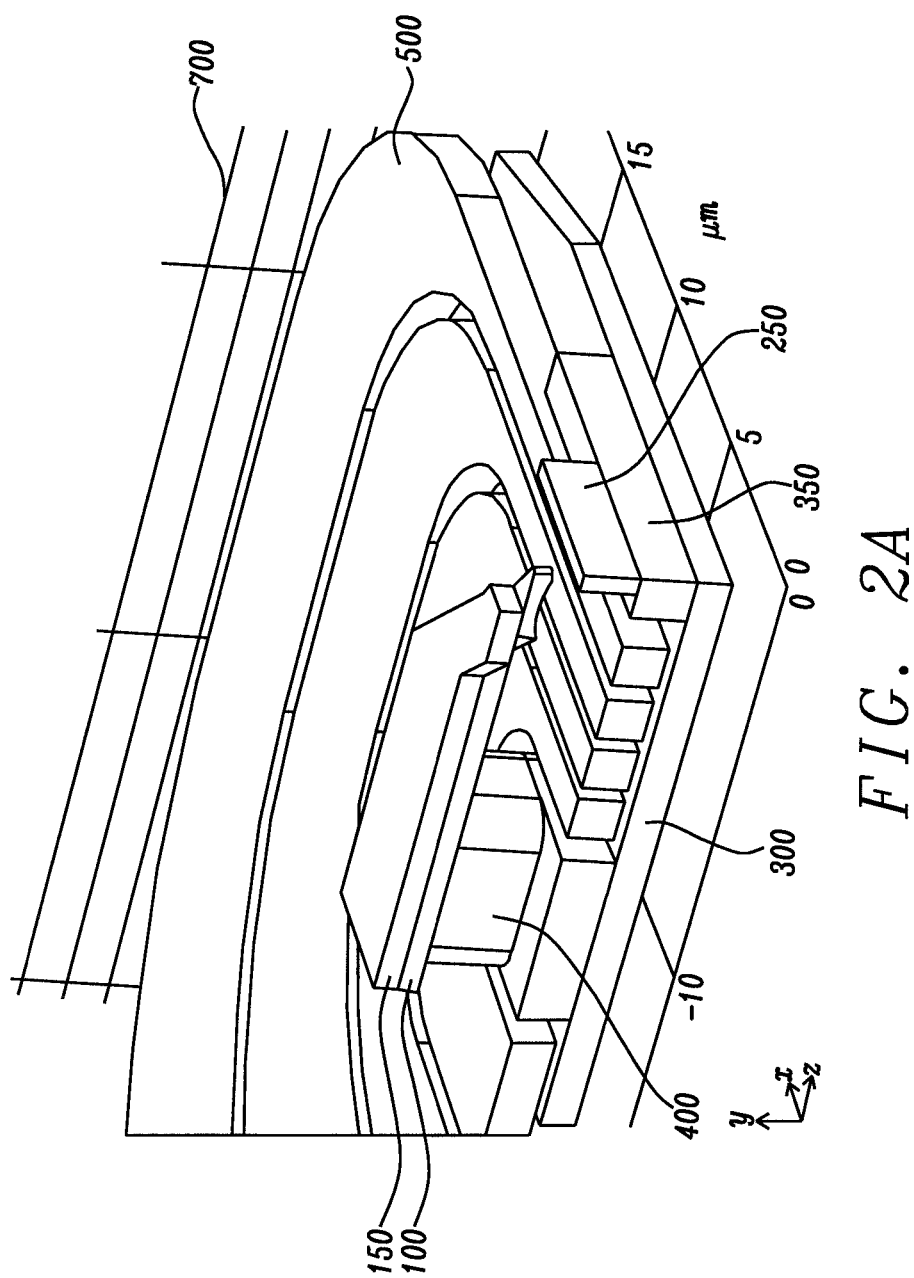
FIG. 2A is three-dimensional view of the SYD writer shown in half view.

Referring now to FIG. 1C there is shown schematically the SYD design which has a fairly straight top-yoke 150, a similarly straight pole 80 and a return pole 200, but as will be seen in FIGS. 2A, B and C, it features a split-yoke configuration that produces a similar effect, but with additional benefits, to what the prior art designs obtain by sloping the pole.

The design of FIG. 1C disclosed herein is a split-yoke design and it is designated by the acronym SYD. It is capable of delivering magnitudes of magnetic field as strong as that of the LRP design (about 11 kOe), but it does so with fewer coil turns, 4 turns 10 for the SYD vs. 6 turns for the LRP (see FIG. 1A). Further, it features a planar continuous main pole layer 100 which makes it more process-friendly in addition to being able to perform at high data rates.

The SYD is also compatible with helical coils, for even faster rise time. Thus, the new design can be considered as an improvement over both prior art designs.

As discussed above, the previous design, LRP, required 6 turns of coil to increase the magnetic flux density and generate higher fields at the main pole. Such a large number of turns means that the turns will inevitably be separated in two layers in order to accommodate a near field transducer (not shown). This requires a bottom coil layer which is on top of the return pole and a top coil layer which has to fit under the top yoke. Therefore, the top coil layer forced the top yoke to be plated around the coils thus resulting in a curvature which does not favor the head field rise time. The SYD feature in the new design has improved performance compared to the previous design and only requires one layer of 4 turns of coils.

The previous TRC design of FIG. 1B features a sloped main pole 70, which is beneficial for magnetic field rise time. But the steps involved in such a fabrication slope make the overall process lengthy. The SYD eliminates the need of a sloped pole and requires far fewer process steps than the TRC design. The new writer head structure is also expected to show lower write-induced writer protrusion (heat-induced protrusion) than the LRP and TRC designs. Finally, the planar pole and yoke design of SYD (100 and 150 of FIG. 1C), augmented by moving the yoke slightly backward (proximally) relative to the magnetic pole, is also beneficial for the rapid movement ("switchability") of magnetic domains at the distal end because of the elimination of dipole interactions between the domains.

Figure 2B:
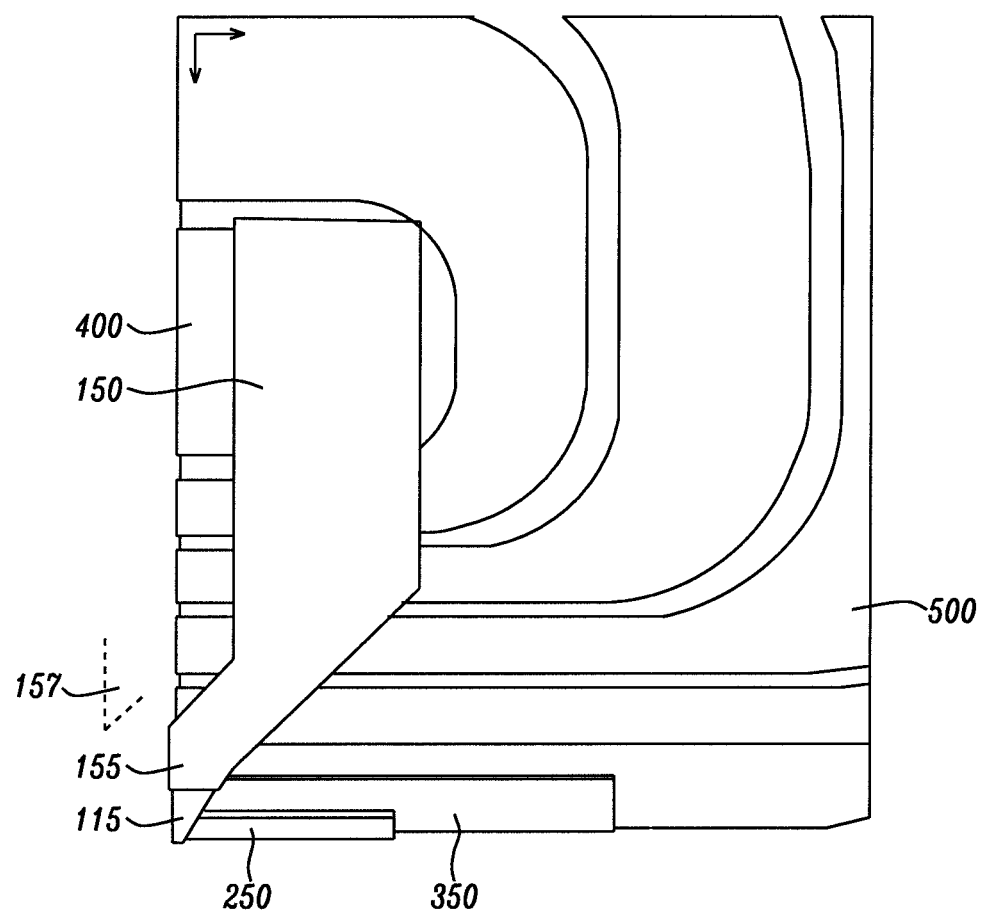
FIG. 2B is a top view of the SYD writer of 2A.
Figure 2C:
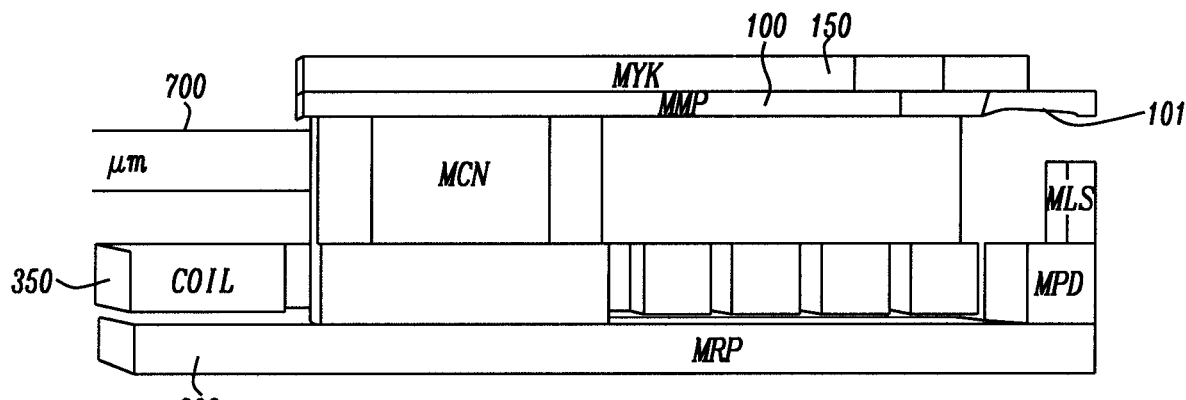
FIG. 2C is a cross-sectional view of the SYD writer showing clearly the split yoke design and approximate dimensions in microns. The names of the different parts of the writer head: magnetic top yoke (MYK), magnetic main pole (MMP), via connector (MCN), return pole (MRP), pedestal (MPD), leading shield (MLS) and the coils (COIL).

The details of the structure of the disclosed SYD design are shown three-dimensionally in FIG. 2A, with top and side views shown in FIGS. 2B and 2C, respectively. In each illustration the end of an element closest to the ABS is denoted the "distal" or ABS end and the opposite end is the "proximal" end. The acronyms denoting the different parts of the new writer head are defined in FIG. 2C.

Looking at FIG. 2A, the key features are labeled as follows. The main magnetic pole (MMP) is 100 and the magnetic top yoke (MYK) is 150. The coil (COIL) is 500. The via connector (MCN) is 400; it magnetically connects to the return pole (MRP) 300. A pedestal (MPD) 350 is formed on the return pole and a leading shield (MLS) 350 is formed on the pedestal. The figure is surrounded by coordinate lines 700 calibrated in micrometers to give an indication of the dimensions.

A key feature of the SYD design is that both magnetic main pole (MMP) 100 and magnetic top yoke (MYK) 150 layers are horizontal planar layers that are contiguous and substantially identical in shape until their distal ends (115 and 155 in FIG. 2B) are approached. As that figure shows clearly, the tip of the main pole 115, extends distally beyond the distal edge 155 of the top yoke 150.

The spacing for preventing optical power loss is obtained by means of a gap between the left and right portions of the continuous MMP and MYK layers rather than by a sloping pole. This gap is seen most clearly in FIG. 4C where it has an exemplary width of 2.3 μm. To obtain the gap between these layers, they are formed as a substantially identical pair, positioned side-by-side in a mirror-image symmetric configuration. The resultant "Y" shape of the MYK and MMP layers are obtained by photolithography, using a mask with the proper geometry. Note that FIG. 2B looks down at the right side of the yoke 150, the left side would be a mirror image symmetric form, but it is not shown. The "flare" angle 157 is the angle at which the right and left sides separately approach each other symmetrically The proximal inner edges of the two portions, left and right, form a gap between them, which is uniform in width at the proximal end and converges essentially linearly towards the distal end, with the yoke and magnetic pole tips coming into contact at their distal ABS ends. As can be seen in the figure, the yoke, 150, terminates distally 155 before the tip of the magnetic pole 115 so that the magnetic pole extends out distally from beneath the yoke.

FIG. 2B is an overhead right-side view corresponding to the right-side cross-sectional view of FIG. 2C and the plan view of FIG. 2A. A corresponding left-side top view (not shown) would be horizontally mirror symmetric to the elements in FIG. 2B. The distal inner edges 115 and 155 of the MMP (hidden beneath MYK) and the MYK 150, respectively, would touch corresponding edges of the left-side MMP and MYK (not shown), with the MYK distal end terminating proximally behind (further from the ABS) the MMP end, which extends to the ABS. The distal ends of the MYK and MMP jog away from the inner edges 155 and 115 making a "flare angle" 157 of 45° with the central axis. The 45° flare angle becomes 0° when the gap in the MMP and MYK layers equals the width of the back gap in the via-connector 400. Note that the plan view 2A shows FIG. 2B in perspective. A set of coordinate lines, 700, separated by 1 μm are shown against the side wall to indicate the separation between the upper and lower pole pieces of approximately 2 μm and a length of the upper pole piece of approximately 10 μm.

The purpose of splitting the two top layers is to avoid any electromagnetic coupling between the main pole layer of the write-head and its optical parts (not shown here). The splitting must also not harm the overall magnetic performance of the write-head, therefore it is important to maximize the overlapping area between the MCN and the MMP layer in order to maximize the magnetic flux density. The gap between the left and right flat, preferably mirror-symmetric portions plays a similar role as the slope of a main pole in prior art designs, namely to eliminate, as much as possible, interaction between the magnetic fields doing the writing and the optical near fields doing the heating in a TAMR configuration. In addition, the flatness of the MMP and MYK layers allow better magnetic domain wall propagation by eliminating undesirable dipole interactions between the domains. We will discuss this further below.

In FIG. 2C, the ABS (distal) end of the MMP layer 100 appears slightly concave 101 at its underside. This is a result of the fabrication process and is not an intentionally formed feature of the head. The MMP layer then follows the topology of the layer beneath it, which would be a heat sink layer. The heat sink layer generally surrounds the MMP layer on its sides and bottom and is not shown.

Because of its improved magnetic properties, the presently disclosed SYD only requires one flat layer of 4 turns of coils. The LPR required two layers of 3 turns (6 turns in total) of coils to generate a writing field of similar magnitude. The LRP design was observed to suffer from slow write field rise time and high writer induced protrusion. The new design generates fields with similar strength as the previous design, but the rise time is much faster—almost reduced by half, 104 ps (picoseconds) compared to 196 ps—as can be seen in FIG. 3A. This also allows the SYD design to maintain a higher signal-to-noise ratio at faster data rates as shown in FIG. 3B.

The simulation results shown in FIGS. 4A and 4B indicate that the SYD induces no electromagnetic coupling with the waveguide, so the gap in the middle of the MMP layer gives sufficient spacing from the waveguide so that no optical power (shown as concentric circles of various shading intensity) is lost. The simulations took into account the presence of the Ru main pole heat sink, which effectively reduces the gap distance in the main pole layer (see FIG. 4A). The 24 kG magnetic material of the main pole is known to be able to induce more severe power loss than Ru if it is coupled with the waveguide. In the second part of this simulation (FIG. 4B), the Ru barrier was replaced by arbitrary 24 kG magnetic material. This would represent the worst-case scenario where the optical power loss would be the highest. Even in that case, no optical power loss was observed in the simulation. This indicates that the SYD is a viable option for writer head design improvement for TAMR, featuring the advantages from both LRP and TRC while eliminating their most noticeable drawbacks. FIG. 4C is a schematic illustration showing an overhead view of the split yoke with the yoke 150 covering the magnetic pole with only the pole tip 115 shown emerging from beneath the yoke.

More specific considerations need to be made regarding the optimization of the magnetic properties of the new design. We have analyzed the magnetic domain configurations at the steady state (after writer head is fully saturated) around the splitting point of the MMP layer (point where the MMP and MYK layers begin to angle towards each other) with a micromagnetic model using the Landau-Lifshitz-Gilbert equation for magnetization dynamics. In one simulation (not shown herein) the domain configuration was calculated assuming that the splitting point for the MYK layer is aligned with that of the MMP layer. In that case we see a relatively large proportion of domains in a region around the splitting point of the MMP layer which correspond to domains that are unable to switch as the polarity of the coil current is changed. This can be explained by the presence of undesirable dipolar interactions between the MYK layer and the MMP layer that force the domains around the splitting point of the MMP layer to be aligned antiparallel to the domains at the tip of the MMP in order to have flux closure, which is energetically more favorable. Domains that are unable switch in the main pole region can be an issue for high data rate recording. This issue can be resolved by shifting the splitting point of the MYK layer towards the back of the structure (as it is shown in the figures), so that it becomes slightly misaligned with the splitting point of the MMP layer. In this case the domains are aligned in a configuration that makes switching more energetically favorable Having a recessed top yoke as shown here gives an advantage over a top yoke that is exposed to the ABS. An exposed top yoke would draw magnetic flux lines away from the tip of the main pole and would result in weaker fields with a slower rise time.

Making the MMP and MYK layers shorter than the MRP layer also gives an additional gain in head field rise time. It can be seen from FIG. 5A that the portion of MMP 100 and MYK 150 layers extending beyond the MCN, 400 in a proximal direction away from the ABS actually participates in drawing magnetic flux lines away from the tip of the MMP closest to the ABS. Trimming the two top layers, MMP 100 and MYK 150, so that they are coincident with the back of the via connector (MCN) 400, as shown in FIG. 5B, slightly increases the magnetic flux density (darker region) in the front (ABS) part of the MMP layer. Note that beneath each figure there is a schematic overhead view of the MMP layer showing the flux density by shading. The clear region shows minimum flux density.

The thickness of the MYK layer also plays a role in the overall magnetic properties of the writer head (see FIGS. 6A and 6B). With increasing MYK layer thickness, the perpendicular field increases monotonically, but the head field rise time has an optimum at a thickness around 500 nm.

Referring now to FIGS. 7A and 7B, there is shown a schematic illustration of certain of the TAMR components of the write head, with 7A showing a side view and 7B showing an ABS view. Referring first to FIG. 7A there is shown the optical waveguide 70 directed towards the ABS end of the figure. The waveguide is terminated by a waveguide blocker, 72, which is an element designed to block excessive radiation from reaching regions where it is not desired and make the radiation transfer more efficient. The near-field transducer 73 couples to the distal end of the waveguide where it is energized to heat the recording medium so it can be written upon by the main magnetic pole 75. The pole is surrounded by heat sink layers 76.

The ABS view is shown in FIG. 7B. The main pole tip is 115 and the surrounding heat sink layer is 76. A front shield is shown as 250, a pedestal is shown as 350 and the return magnetic pole is 200.

Referring now to FIGS. 8, 9 and 10, there is shown the elements of an exemplary magnetic recording apparatus, such as a TAMR configured hard disk drive (HDD), in which the TAMR writer described above will be mounted and will meet all objects of this disclosure.

FIG. 8 shows a head gimbal assembly (HGA) 1200 that includes the slider-mounted TAMR writer 1100, the slider now providing aerodynamic support to the writer when it moves above or below an operational disk recording medium 1140. There is also shown a suspension 1220 that elastically supports the slider-mounted writer 1100. The suspension 1220 has a spring-like load beam 1230 made with a thin, corrosion-free elastic material like stainless steel. A flexure 1235 is provided at a distal end of the load beam and a base-plate 1240 is provided at the proximal end. The slider mounted TAMR writer 1100 is attached to the load beam 1230 at the flexure 1231 which provides the TAMR head with the proper amount of freedom of motion. A gimbal part for maintaining the PMR read/write head at a proper level is provided in a portion of the flexure 1233 to which the TAMR 1100 is mounted.

A member to which the HGA 1200 is mounted to arm 1260 is referred to as head arm assembly 1220. The arm 1260 moves the read/write head 1100 in the cross-track direction (arrow) across the medium 1140 (here, a hard disk). One end of the arm 1260 is mounted to the base plate 1240. A coil 1231 to be a part of a voice coil motor (not shown) is mounted to the other end of the arm 1260. A bearing part 1233 is provided to the intermediate portion of the arm 1260. The arm 1260 is rotatably supported by a shaft 1234 mounted to the bearing part 1233. The arm 1260 and the voice coil motor that drives the arm 1260 configure an actuator.

Referring next to FIG. 9 and FIG. 10, there is shown a head stack assembly 1250 and a magnetic recording apparatus in which the slider-mounted TAMR writer 1100 is contained. The head stack assembly is an element to which the HGA 1200 is mounted to arms of a carriage having a plurality of arms for engaging with a plurality of disks 1140. The plurality of disks are mounted on a spindle 1261. FIG. 9 is a side view of this assembly and FIG. 10 is a plan view of the entire magnetic recording apparatus.

Referring finally to FIG. 10, the head stack assembly 1250 is shown incorporated into a magnetic recording apparatus 1290. The magnetic recording apparatus 1290 has a plurality of magnetic recording media 1140 mounted on a spindle motor 1261. Each individual recording media 1140 has two TAMR elements 1100 arranged opposite to each other across the magnetic recording media 14 (shown clearly in FIG. 9). The head stack assembly 1250 and the actuator (except for the write head itself) act as a positioning device and support the PMR heads 1100. They also position the PMR heads correctly opposite the media surface in response to electronic signals. The read/write head records information onto the surface of the magnetic media by means of the magnetic pole contained therein.

As is understood by a person skilled in the art, the present description is illustrative of the present disclosure rather than limiting of the present disclosure. Revisions and modifications may be made to methods, materials, structures and dimensions employed in forming and providing a magnetic write head configured for TAMR, where the magnetic pole and magnetic yoke are formed as a split configuration that allows both yoke and pole to be planar layers for improvement of field strength and rise time, yet eliminating adverse interactions between the magnetic field and the optical radiation field, while still forming and providing such a device and its method of operation in accord with the spirit and scope of the present disclosure as defined by the appended claims.

We claim:

1. A TAMR (Thermally Assisted Magnetic Recording) write head comprising:
   a top yoke;
   a main magnetic pole beneath said top yoke;
   a return magnetic pole vertically beneath and parallel to said main magnetic pole;
   a connector formed between said main magnetic pole and said return pole, wherein said connector provides flux closure between said main magnetic pole and said return pole; wherein
   said top yoke and said main magnetic pole are contiguous horizontal planar layers extending distally from a rear terminus towards an ABS end; wherein said top yoke and said main magnetic pole are each formed as a split structure that is split into two separate portions and supported at their proximal ends by said connector; wherein each said separate portion of said contiguous top yoke and main magnetic pole have inner edges that are separated from each other for a certain distance from their rear terminus towards their ABS ends, wherein said rear terminus is at least co-extensive with a rear terminus of said connector; wherein said two portions extend distally towards an ABS plane, remaining parallel to said return pole, until a "splitting point", referring to a point at which said top yoke layer and said main magnetic pole layer of each separate portion diverges in shape and where inner edges of said two said portions converge to come into contact along said inner edges and from which point said main magnetic pole extends distally to said ABS while said top yoke terminates a certain distance away from said ABS.

2. The TAMR write head of claim 1 wherein said two portions are mirror-symmetric and are each formed as substantially congruent rectangular portions having inner edges that are separated and parallel and that extend distally towards an ABS plane while still remaining parallel to said return pole, until a splitting point is reached at which point said top yoke layer and said main magnetic pole layer of each portion diverge in shape and where inner edges of said two portions converge to come into contact along said inner edges and form a flare angle between their inner edges and from which point of contact said main magnetic pole extends distally to said ABS while said top yoke terminates a certain distance away from said ABS.

3. The TAMR write head of claim 2 wherein inner edges of said magnetic yoke layer and said magnetic pole layer converge at said splitting point, with each side forming a flare angle of 45° with respect to an axis of symmetry at said splitting point, which point is 1.5 μm proximally away from the ABS and wherein, at a proximal distance of 2.75 μm from said ABS said flare angle becomes 0° and said inner edges are parallel.

4. The TAMR write head of claim 3 wherein said magnetic yoke layer is approximately 400 nm thick and formed of a material having a lower moment than that of said magnetic pole layer.

5. The TAMR write head of claim 2 wherein said magnetic pole layer is approximately 400 nm thick and formed of a high magnetic moment material.

6. The TAMR write head of claim 1 wherein a pedestal and leading shield extend upward from an ABS edge of said return pole and are co-planar with said ABS plane and wherein said pedestal contacts said return pole and said leading shield is formed on said pedestal and terminates at a distance below said magnetic main pole.

7. The TAMR write head of claim 1 wherein a horizontal, planar coil of conducting material is formed on said return pole and is wrapped around a base of said connector forming a flat coil of 4 turns.

8. The TAMR write head of claim 1 wherein said magnetic pole layer is surrounded by a heat-sink layer formed of Ru.

9. The TAMR write head of claim 1 wherein said magnetic pole layer is formed of a magnetic material of 24 kG (kilo Gauss) moment to a length of approximately 10 μm measured rearward from its ABS end and a thickness of approximately 400 nm.

10. The TAMR write head of claim 1 wherein said magnetic return pole is formed of a magnetic material of 19 kG (kilo Gauss) moment.

11. The TAMR write head of claim 1 wherein said connector, said pedestal and said leading shield are formed of a magnetic material of 19 kG (kilo Gauss) magnetic moment.

12. The TAMR write head of claim 1 wherein said connector is formed of a magnetic material of 24 kG (kilo Gauss) magnetic moment.

13. The TAMR write head of claim 1 further comprising a TAMR apparatus comprising a near-field transducer positioned so that an optical field enhancing portion of said transducer is separated from said magnetic write pole by a metallic barrier formed of any of the elements Rh, Ir, Ru, Pt, Pd or their composites.

14. The TAMR write head of claim 13 wherein said left and right yoke and pole portions are mirror-symmetric and wherein said near-field transducer is activated by optical energy from an adjacent optical waveguide extending along an axis of symmetry beneath and between mirror-symmetric left and right pole and yoke portions and wherein there is no loss of said optical energy from said optical waveguide due to proximity of optical and near-field components as a result of said gap between left and right mirror-symmetric portions of said magnetic pole and yoke combination.

15. A head gimbal assembly, comprising
the TAMR write head of claim 1 mounted on a slider;
a suspension that elastically supports said slider-mounted TAMR read/write head, wherein
said suspension has a flexure to which said slider-mounted TAMR read/write head is joined, a load beam with one end connected to said flexure and a base plate connected to the other end of said load beam.

16. A HDD (Hard Disk Drive), comprising:
the head gimbal assembly of claim 15;
a magnetic recording medium positioned opposite to said slider-mounted TAMR;
a spindle motor that rotates and drives said magnetic recording medium;
a device that supports the slider and that positions said slider relative to said magnetic recording medium.

\* \* \* \* \*